US010270865B1

(12) United States Patent
Heath et al.

(10) Patent No.: US 10,270,865 B1
(45) Date of Patent: Apr. 23, 2019

(54) METHOD FOR HANDING OFF A COMMUNICATIONS SESSION

(71) Applicant: Eckoh UK Limited, Hemel Hempstead, Hertfordshire (GB)

(72) Inventors: James Heath, Hove (GB); Thomas Edward Briden, Leighton Buzzard (GB); Cameron Peter Sutherland Ross, St. Albans (GB)

(73) Assignee: Eckoh UK Limited, Hemel Hempstead (GB)

( * ) Notice: Subject to any disclaimer, the term of this patent is extended or adjusted under 35 U.S.C. 154(b) by 38 days.

(21) Appl. No.: 15/913,588

(22) Filed: Mar. 6, 2018

(30) Foreign Application Priority Data

Jan. 29, 2018 (GB) .................................. 1801438.1

(51) Int. Cl.
| G06F 15/16 | (2006.01) |
| H04L 29/08 | (2006.01) |
| H04M 3/51 | (2006.01) |
| H04L 12/58 | (2006.01) |

(52) U.S. Cl.
CPC ............ *H04L 67/148* (2013.01); *H04L 51/04* (2013.01); *H04L 51/08* (2013.01); *H04L 67/146* (2013.01); *H04L 67/2842* (2013.01); *H04M 3/5191* (2013.01); *H04M 3/5183* (2013.01)

(58) Field of Classification Search
CPC .................................................. H04M 3/5183
See application file for complete search history.

(56) References Cited

U.S. PATENT DOCUMENTS

| 7,099,946 | B2 * | 8/2006 | Lennon | ............. | G06F 17/30905 |
| | | | | | 707/E17.121 |
| 7,526,559 | B1 * | 4/2009 | Phillips | ................... | H04L 67/14 |
| | | | | | 709/203 |
| 8,775,635 | B2 * | 7/2014 | Koch | .................. | H04M 7/0027 |
| | | | | | 379/201.01 |
| 8,972,507 | B1 | 3/2015 | Hendren et al. | | |
| 9,020,121 | B1 * | 4/2015 | Dhanda | ................... | H04M 3/42 |
| | | | | | 379/127.06 |
| 9,479,491 | B1 * | 10/2016 | Farnsworth | ............. | H04L 63/08 |

(Continued)

FOREIGN PATENT DOCUMENTS

EP          1 199 872 A2    4/2002

*Primary Examiner* — Hieu T Hoang
(74) *Attorney, Agent, or Firm* — Blank Rome LLP (57) ABSTRACT

A method of handing off a communications session between a first device and a second device, to a third device. The method comprises: receiving information associated with a communications session between first and second devices, and storing it in a cache; storing a generated identifier of the session; sending a message comprising the identifier to the first device; receiving a request, comprising the identifier, from the first device to initiate handoff to a third device; outputting an address and the identifier, for delivery to the third device; receiving a connection request comprising the identifier from the third device; using the identifier to retrieve the information; sending at least one message to the third device comprising the information, a request to store the information on the third device, and a request to establish a further communications session with the second device; and serving the further session to the third device.

19 Claims, 6 Drawing Sheets

(56) References Cited

U.S. PATENT DOCUMENTS

| | | | |
|---|---|---|---|
| 2002/0146668 A1* | 10/2002 | Burgin | G06F 17/30873 434/118 |
| 2003/0101343 A1* | 5/2003 | Eaton | H04L 51/04 713/170 |
| 2009/0235329 A1* | 9/2009 | Chavez | H04L 63/105 726/3 |
| 2014/0351370 A1* | 11/2014 | Ashley | H04L 67/148 709/217 |
| 2015/0237207 A1 | 8/2015 | Ordille et al. | |
| 2015/0358410 A1 | 12/2015 | Chandrasekaran et al. | |
| 2016/0349960 A1* | 12/2016 | Kumar | G06F 3/04817 |
| 2017/0149844 A1* | 5/2017 | Pirat | H04L 65/1069 |
| 2017/0323361 A1* | 11/2017 | Giro | G06Q 30/0617 |

* cited by examiner

METHOD FOR HANDING OFF A COMMUNICATIONS SESSION

FIELD OF THE INVENTION

The present invention relates to a method and system for handing off a communications session, in particular handing off a communications session between a first computing device and at least one second computing device, to a third computing device.

BACKGROUND OF THE INVENTION

Customers who do not shop in a physical retail environment are increasingly demanding a seamless transaction regardless of which channel they wish to shop through. For example, a customer may wish to start a transaction by browsing a merchant website, then engaging with an online instant messaging (IM) chat session, and finish by calling a contact center to speak with a contact center agent to complete an order.

The effect of this 'omni-channel' or 'multi-modal' approach is that contact center systems and agents need to be able to deal with customer demands across the various channels, in a seamless manner. If a customer has spent time, say, filling a shopping basket online, it is frustrating to find that the contact center agent cannot see or interact with the contents of that basket during a subsequent phone call with the customer. Similarly, if contact with a customer begins with a phone call, the customer has a better experience if they are able to seamlessly 'pick up' an agent-initiated order or basket during a subsequent online session.

In the contact center itself, agents may handle telephone calls, emails, text messages and IM chat sessions with customers. Changing modes or channels is not uncommon. For example, a call may arrive from a customer with whom the agent has been chatting in an IM chat session for the past few minutes.

Screen sharing or co-browsing are technologies well known in the contact center industry. Here, the agent and customer are able to see a synchronized view of each other's online activity. In this way, the agent may be able to guide customer to a particular part of a merchant website, to (for example) display an item of clothing that the customer may be interested in.

Such an approach is also possible for an agent chatting with a customer through an online chat service.

Screen sharing and co-browsing have other benefits too. For example, a customer's sensitive data, such as payment card details, may be masked or blanked from the contact center agent. Such an approach may ensure security for the customer's personal data, as the contact center systems are never exposed to the customer's card details. Potential data breaches are therefore eliminated. Such approaches can help merchants deal with increasing regulation and compliance requirements, such as those set out by the Payment Card Industry Data Security Standard (PCI DSS), the General Data Protection Regulation (GDPR), the revised Directive on Payment Services (PSD2), etc.

Another technology presently used in contact centers, allows an agent to create a 'shopping basket' for a customer, and then to send the customer a payment request. Typically, the customer is emailed a payment link. Launching this link in a web browser, the customer can review the potential purchase, and then insert payment details to a secure website. The contact center systems receive confirmation that payment has been taken, and dispatch can take place.

However, the creation and sending of such a payment link to a customer typically requires a merchant to modify their existing order process. A process which was created for the internal use of a contact center agent may need substantial changes in order to allow a customer to enter their own payment details. Since session-related information cannot be easily transferred between agent and customer, it therefore remains difficult for contact centers to adequately provide true 'personal shopper' services, or to allow customers to shift channels during an interaction with the merchant.

Hence, there exists a need to improve both the present screen sharing and secure payments processes, as well as enhancing customer service.

SUMMARY OF THE INVENTION

The inventors have recognized that in the known systems whereby a customer is emailed a payment link, even if the customer is able to pay securely using the payment link, the link itself doesn't give access to the shopping basket itself. Rather, the customer typically sees only an order summary. If the customer wishes to, for example, add or remove items from the shopping basket, they are unable to if it has been created by an internal merchant order system and operated by a contact center agent. In essence, the customer is unable to take control of their own shopping experience. They cannot, for example, start a shopping experience on a telephone call, and complete it online, whilst having complete ongoing access to their own shopping basket.

As a result, today's contact centers can only fulfil part of a 'personal shopper' role. They can presently perform online or telephone-based consultation, advising customers on items for sale, and adding these items to a shopping basket, for example. However, if the customer chooses to continue their shopping experience later, or in a different channel, the contact center cannot 'hand over' the shopping basket to the customer.

The technical difficulty with 'handing over' a shopping basket is understandable when we consider the typical design and operation of shopping baskets. If an agent starts a browsing session on behalf of a customer who has called a contact center, the agent's browser stores cookies related to this browsing session. The stored cookies may contain information linking the agent's browser with a back-end order system, for example. The cookies are often 'secure', in the sense that the browser and back-end system agree that they can only be transferred over an encrypted HTTP session. Browser, network, and back-end systems are typically explicitly designed to prevent secure cookies from being intercepted, or transferred from one user to another.

The inventors have recognized that there is a need to engage with customers across multiple channels, but also to share information between a contact center agent and customer to provide a seamless transaction.

According to one aspect of the present disclosure there is provided a method of handing off a communications session between a first computing device and at least one second computing device, to a third computing device, the method comprising, at a server: establishing a first connection with a first computing device; establishing a second connection with at least one second computing device; mediating a communications session between the first computing device and the at least one second computing device; receiving session-related information associated with said communications session from the at least one second computing device via the second connection, and storing said session-related information in a data cache; generating a session identifier to identify said communications session and storing said session identifier in the data cache; sending a message comprising at least the session identifier to the first computing device via the first connection; receiving via the first connection a request from the first computing device to initiate handoff to a third computing device, the request comprising the session identifier; outputting an address to which a third connection request can be directed, and the session identifier, for delivery to a third computing device associated with a user; receiving a connection request from the third computing device, the connection request comprising the session identifier; in response to receiving the connection request, establishing a third connection with the third computing device; using the session identifier to retrieve the session-related information from the data cache; sending at least one message to the third computing device, the at least one message comprising the session-related information, a request to store the session-related information on the third computing device, and a request to establish a further communications session with the at least one second computing device; serving the further communications session to the third computing device in response to receiving, from the third computing device, a request to establish the further communications session with the at least one second computing device; and mediating the further communications session between the at least one second computing device and the third computing device.

Thus embodiments of the present invention enable a merchant to securely serve a customer across multiple communications channels, whilst still allowing the customer to take control of their own shopping experience at the appropriate time. In other words, a contact center agent is able to 'hand off' the communication session to the customer.

The method may further comprise, at the server: in response to establishing the third connection with the third computing device, terminating the first connection with the first computing device.

The method may further comprise, at the server: in response to establishing the third connection with the third computing device, mediating the further communications session between the first computing device and the third computing device.

The method may further comprise, at the server: during mediating the further communications session, detecting sensitive data for output to at least one of the first computing device and the third computing device and masking the sensitive data to prevent output of the sensitive data at the at least one of the first computing device and the third computing device.

The method may further comprise the server outputting a message, comprising the address and the session identifier, to the third computing device using a device identifier of the third computing device.

The method may further comprise the server outputting a message, comprising the address and the session identifier, to a further computing device associated with said user using a device identifier of the further computing device, the at least one message for output at the further computing device to thereby facilitate delivery of the address and the session identifier to the third computing device.

The method may further comprise the server outputting a message, comprising the address and the session identifier, to the first computing device using a device identifier of the first computing device, the at least one message for output at the first computing device to thereby facilitate delivery of the address and the session identifier to the third computing device.

The method may further comprise the server outputting a message, comprising the address and the session identifier, using an identifier of said user, the at least one message for receipt at the third computing device, or at a further computing device associated with said user to thereby facilitate delivery of the address and the session identifier to the third computing device. The method may further comprise the server outputting a message, comprising the address and the session identifier, using an identifier of an agent associated with said first computing device, the at least one message for output at the first computing device to thereby facilitate delivery of the address and the session identifier to the third computing device.

The method may further comprise, at the server: bridging a call between an agent of the first computing device and the user of the third computing device; wherein sending the message to the user of the third computing device comprises sending the message as an audio message to the user during the call.

The method may further comprise, at the server: bridging a call between an agent of the first computing device and the user of the third computing device, and communicating the address and the session identifier in an audio message to the agent of the first computing device during the call for relaying to the user of the third computing device during the call.

The call may be conducted by the user of third computing device using the third computing device or a communications device associated with the user of the third computing device; and the call may be conducted by the agent of the first computing device using the first computing device or a communications device associated with the agent of the first computing device.

The request from the first computing device may comprise an identifier associated with the user of the third computing device. The identifier associated with the user of the third computing device may comprise an email address of the user of the third computing device, or an instant messaging identity of the user of the third computing device.

The request from the first computing device may comprise a device identifier associated with the third computing device. The identifier associated with the third computing device may comprise an IP address of the third computing device or a telephone number of the third computing device.

The request from the first computing device to initiate handoff to the third computing device may comprise a URL of a webpage, the method may further comprise, at the server storing the URL of the webpage and the session-related information in association with the session identifier in the data cache.

The request from the first computing device to initiate handoff to the third computing device may be received in response to selection of a user interface element of said webpage displayed on a display of the first computing device The request to establish the further communications session with the at least one second computing device in the at least one message may comprise the URL of the webpage, and serving the communications session to the third computing device may comprise delivering said webpage to a web-browser executed on the third computing device.

The communications session may comprise a web browser session and the session-related information comprises browser cookies.

According to another aspect of the present disclosure there is provided a computer program product for handing off a communications session between a first computing device and at least one second computing device, to a third computing device, the program product comprising code embodied on a computer readable medium and configured so as when executed on a processing apparatus of a server to perform any of the method steps described herein.

According to another aspect of the present disclosure there is provided server for handing off a communications session between a first computing device and at least one second computing device, to a third computing device, the server comprising a processing apparatus configured to: establish a first connection with a first computing device; establish a second connection with at least one second computing device; mediate a communications session between the first computing device and the at least one second computing device and; receive session-related information associated with said communications session from the at least one second computing device via the second connection, and storing said session-related information in a data cache; generate a session identifier to identify said communications session and storing said session identifier in the data cache; send a message comprising at least the session identifier to the first computing device via the first connection; receive via the first connection a request from the first computing device to initiate handoff to a third computing device, the request comprising the session identifier; output an address to which a third connection request can be directed, and the session identifier, for delivery to a third computing device associated with a user; receive a connection request from the third computing device, the connection request comprising the session identifier; in response to receiving the connection request, establish a third connection with the third computing device; use the session identifier to retrieve the session-related information from the data cache; send at least one message to the third computing device, the at least one message comprising the session-related information, a request to store the session-related information on the third computing device, and a request to establish a further communications session with the at least one second computing device; serve the further communications session to the third computing device in response to receiving, from the third computing device, a request to establish the communications session with the at least one second computing device; and mediate the further communications session between the at least one second computing device and the third computing device.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

For a better understanding of the present subject matter and to show how the same may be carried into effect, reference will now be made by way of example to the accompanying drawings in which.

DETAILED DESCRIPTION

Specific embodiments will now be described, by way of example only and with reference to the accompanying drawings having the figure numbers as listed above.

Figure 1:
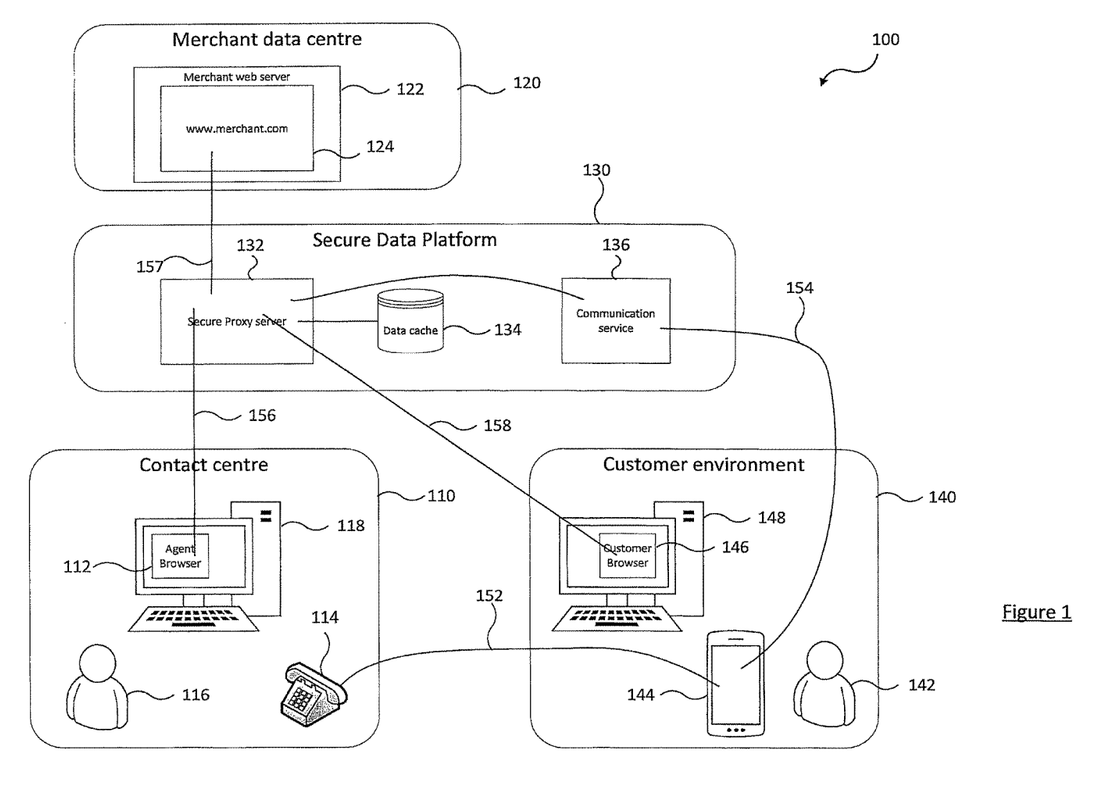
FIG. 1 shows a schematic diagram of an environment in which a customer communicates with a contact center over a telephone call, according to one described embodiment.

FIG. 1 shows a schematic diagram of an environment 100 including a customer environment 140 in which a customer 142 having a communications device 144 dials a contact center 110 for the purpose of requesting goods or a service offered by a company (merchant). The term 'customer' is used herein to refer to a person requesting goods or services offered by the company (merchant).

The communications device 144 may for example be a mobile telephone as shown in FIG. 1, a fixed landline telephone, or a smart home assistant device such as Amazon Alexa® or Google Home™. That is, the communications device 144 may communicate with the contact center 110 via a communication channel 152 which may be over a PSTN network, cellular network, and/or a packet based network (e.g. the Internet) in the case of a Voice over Internet Protocol (VOIP) call.

As shown in FIG. 1, the customer 142 may be associated with a computing device 148 executing a customer browser 146. The computing device 148 may be PC, laptop, tablet or any other computing device able to connect to a secure data platform (SDP) 130 referred to below.

As will explained in more detail below, the communications device 144 may execute the customer browser 146 and therefore it will be appreciated that it is not necessary for the customer 142 to use multiple devices in embodiments described herein (e.g. when the communications device 144 is a smart mobile telephone).

The customer 142 makes a call over the communication channel 152 to the contact center 110. Inside the contact center 110, the customer's call is directed to a telephone 114 associated with an agent 116.

The agent 116 provides service to the customer 142, by accessing a secure data platform 130 through a web browser 112 executed on a computer 118 associated with the agent 116.

The agent 116 may be a person located in the contact center 110. Alternatively, the role of the agent may be fulfilled, partly or completely, by an autonomous or semi-autonomous process executed on the computer 118 or elsewhere in the contact center 110, or outside the contact center 110. Such autonomous or semi-autonomous approaches, well known to those skilled in the art, may allow contact centers to deploy more efficiently center agent resources, or to improve customer service.

As shown in FIG. 1, the agent's web browser 112 is in communication with the secure data platform 130 using connection 156 for example via a packet based network (e.g. the Internet).

As shown in FIG. 1, the secure data platform 130 comprises a secure proxy server 132, a data cache 134 and a communication service 136. Whilst a single secure proxy server 132 is shown in FIG. 1 and referred to herein, it will be appreciated that a plurality of secure proxy servers may perform the operations described herein with reference to the secure proxy server 132. Similarly, it will be appreciated that whilst a single data cache 134 is shown in FIG. 1, multiple data caches may be provided.

As shown in FIG. 1, the secure proxy server 132 is coupled to the data cache 134. Whilst FIG. 1 shows the data cache 134 as being external to the secure proxy server 132, it will be appreciated that the data cache 134 may be an internal component of the secure proxy server 132.

The communication service 136 is operable to send a communication via a communication channel to a computing device in the environment 100 which is associated with customer 142 e.g. the customer communications device 144. The communication service 136 may be configured to send one or more of a plurality of known types of communication to the customer e.g. a SMS message, email or instant message (IM) etc. Whilst FIG. 1 shows the communication service 136 as being external to the secure proxy server 132 e.g. implemented on a server external to the secure proxy server 132, it will be appreciated that the communication service 136 may be implemented as a module on the secure proxy server 132.

The environment 100 further comprises a merchant data center 120 comprising a merchant webserver 122 configured to serve webpages of the merchant's website 124.

The secure proxy server 132 is in communication with the merchant's website 124 using connection 157 for example via a packet based network (e.g. the Internet).

During a communication session between agent browser 112 executed on the agent's computer 118 and the merchant website 124 served by the merchant webserver 122, the secure proxy server 132 on the secure data platform 130 receives a request from the agent's web browser 112 via connection 156 to display a merchant web page of the merchant's website 124 served by the merchant webserver 122 at the merchant data center 120. The secure proxy server 132 forwards this request to the merchant webserver 122 via connection 157. The secure data platform 130 uses the secure proxy server 132 to mediate communications between the merchant website 124 and the agent web browser 112, for the initially-requested web page and subsequent web pages. Requested web pages are delivered from the merchant webserver 122 to the agent's web browser 112 via connections 156,157. The secure proxy server 132 stores information related to the communications session in the data cache 134. The information related to the communications session comprises browser cookies which have been served by the merchant webserver 122 to the agent's browser 112 during the agent's browsing session.

The secure proxy server 132 is part of the communication flow between the agent browser 112 and the merchant website 124, and terminates an SSL connection (or other secure connection) from the agent browser 112 and creates a new one to the merchant website 124. As a result, the secure proxy server 132 has access to all browser cookies, and can store the cookie header name/value pairs in the data cache 134.

An agent 116 is able to transmit a request from the computer 118 to the secure proxy server 132 via connection 156 to hand off the communication session between agent browser 112 and merchant website 124 to the customer's web browser 146. On receipt of the request, the secure proxy server 132 instructs the communication service 136 to send a communication via communication channel 154 to the communications device 144. Whilst FIG. 1 illustrates that the communication may be received by communications device 144, in other embodiments the communication transmitted from the communication service 136 may be received on the computing device 148, on a further computing device not shown in FIG. 1, or received by the customer 142 using a channel not shown in FIG. 1, for entry into customer browser 146. Using the information in the communication transmitted from the communication service 136, the customer 142 uses the customer's web browser 146 (shown in FIG. 1, as an example, as being executed on computing device 148) to browse to an address served by the secure proxy server 132 using connection 158 for example via a packet based network (e.g. the Internet).

The secure proxy server 132 on receipt of a customer browsing request, retrieves relevant information related to the communications session between agent browser 112 and the merchant website 124, from the data cache 134. The secure proxy server 132 transfers the relevant information to the customer browser 146, and serves the customer browser 146 an initial web page using connection 158.

The information related to the communications session between agent browser 112 and the merchant website 124 is sent from the secure proxy server 132 to the customer browser 146.

The secure proxy server 132 is configured to mediate communications between the merchant website 124 and the customer's web browser 146, for the initially-requested web page and subsequent web pages.

Figure 2:
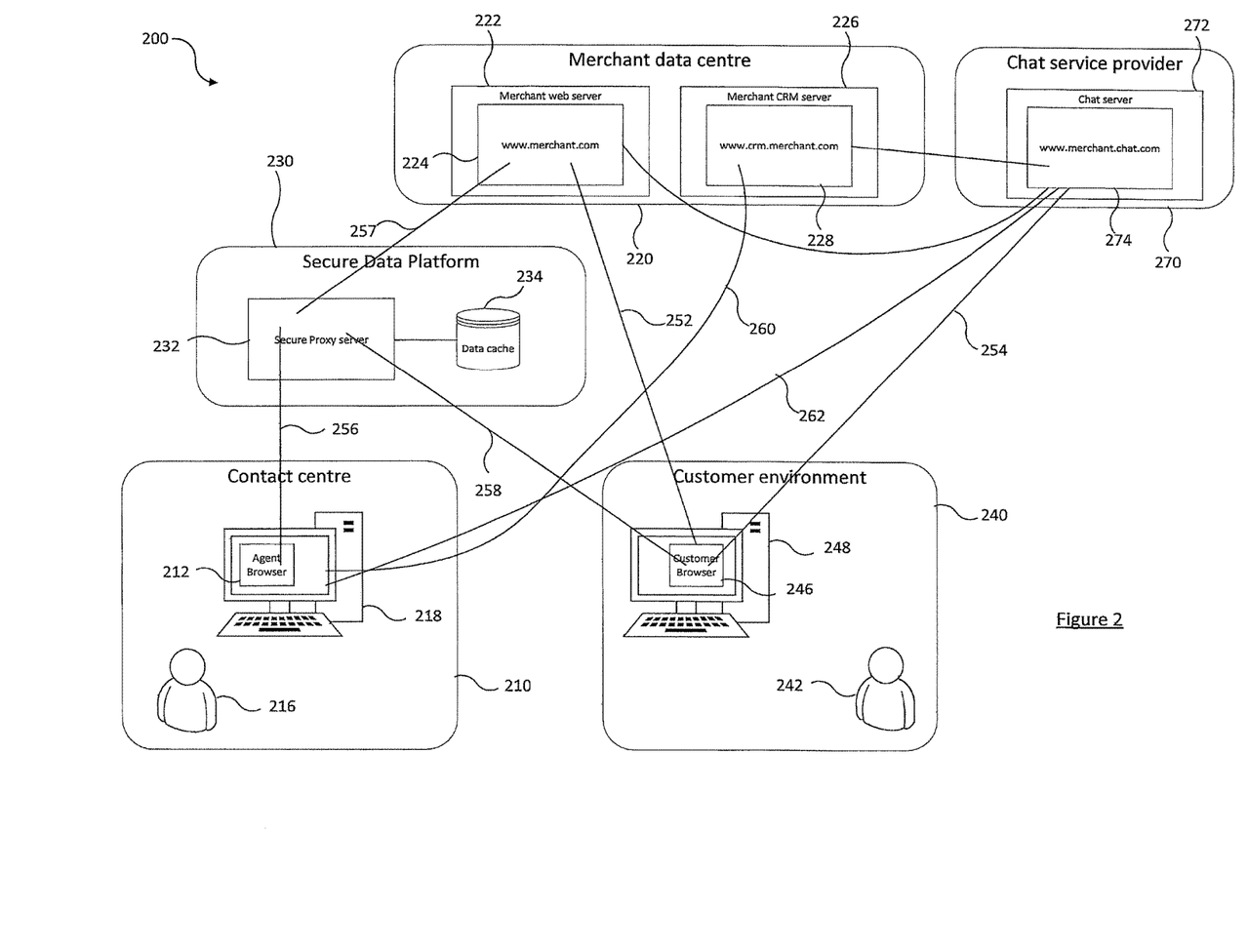
FIG. 2 shows a schematic diagram of an environment in which a customer communicates with a contact center over an IM chat session, according to one described embodiment.

FIG. 2 illustrates an alternative environment 200 in which a customer 242 communicates with a contact center 210 over an IM chat session rather than by telephone. As is well known, an instant messaging communication session allows a chat to be conducted between users of computer devices via a computer network. Each user can enter text into a field, and send it as an instant message which is communicated to another user.

FIG. 2 shows a schematic diagram of an environment 200 in which a customer 242 having a customer browser 246 on computing device 248 browses over connection 252 to merchant website 224, served by merchant web server 222. The merchant website 224 incorporates an IM chat service 274 served by an IM chat sever 272 of a chat service provider 270. The customer's browser 246 also connects to the IM chat service 274 over connection 254.

At a contact center 210, customer service agent 216 uses a customer relationship management (CRM) system 226 over connection 260 to chat with the customer 242, the chat being delivered through the IM chat service 274 via connections 262 and 254.

The customer service agent 216 also performs other customer service duties which utilize the merchant website 224, served to the agent 216 by the merchant web server 222 and moderated by the secure data platform 230. The data cache 234 within the secure data platform 230 stores information related to the communications session between agent browser 212 and merchant website 224. The information related to the communications session comprises browser cookies which have been served by the merchant website 224 to the agent's browser 212 during the agent's browsing session.

The secure proxy server 232 is part of the communication flow between the agent browser 212 and the merchant website 224 and terminates an SSL connection (or other secure connection) from the agent browser 212 and creates a new one to the merchant website 224. As a result, the secure proxy server 232 has access to all browser cookies, and can store the cookie header name/value pairs in the data cache 234.

Unlike in the environment 100, FIG. 2 shows that in the environment 200 the secure data platform 230 does not comprise a communications service, however in the environment 200 the secure data platform 230 may utilize a communications service in order for the secure proxy server 232 to communicate with agent 216 or customer 242.

An agent 216 is able to transmit a request from the computer 218 to the secure proxy server 232 via connection 256 to hand off the communication session between agent browser 212 and merchant website 224 to the customer's web browser 246. On receipt of the request to hand-off the session between agent browser 212 and merchant website 224 to the customer's browser 246, the secure proxy server 232 generates a unique link for the handoff, and displays it on the agent browser 212. The agent 216 passes this unique link to the customer 242 via the IM chat service 274, and the customer 242 sees the link in the customer browser 246.

The customer 242 clicks on (or otherwise selects) the unique link, which causes the customer browser 246 to request an initial web page to be served by the secure proxy server 232, over connection 258.

The secure proxy server 232, on receipt of the customer browsing request, retrieves relevant information related to the communications session between agent browser 212 and the merchant website 224, from the data cache 234. The secure proxy server 232 transfers the relevant information to the customer browser 246, and serves the customer browser 246 the initial web page.

The information related to the communications session between agent browser 212 and the merchant website 224 is sent from the secure proxy server 232 to the customer browser 246.

The secure proxy server 232 is configured to mediate communications between the merchant website 224 and the customer's web browser 246, for the initially-requested web page and subsequent web pages.

In the environments 100,200 described above, the agent 116,216 is able to perform a 'personal shopper' task, which involves filling an online shopping cart on behalf of the customer 142,242 by interacting with the merchant website 124,224. At an appropriate point in the conversation (which may be via a voice or video call or an IM chat), such as when payment is required, the agent 116,216 can request a 'session handoff', and the secure proxy server 132,232 on the secure data platform 130,230 will hand off the agent's browsing session to the customer browser 146,246. Since the secure proxy server 132,232 has cached the relevant session browsing details in the data cache 134,234, it can now copy these to the customer's browser 146,246.

As a result, the customer's browser 146,246 receives a browsing session which is identical to the agent's, in all practical respects. The customer 142,242 can 'pick up where the agent left off', and has the ability to interact with the browsing session in the same way as the agent 116,216.

If the customer 142,242 wishes to add additional items to the pre-filled shopping cart, they may do so. Similarly, they may remove items which on reflection they do not require.

If the agent 116,216 has already logged into a secure merchant website, for example by using a customer's existing account credentials on file, the customer 142,242 will find that their browsing session is similarly logged in already, without a requirement for the customer to enter username or password details.

The session-related information includes both 'standard' and 'secure' browser cookies which have been served by the merchant website 124,224 to the agent's browser 112,212 during the agent's browsing session. These browser cookies are cached in the data cache 134,234, and copied to the customer browser 146,246 when the customer 142,242 starts browsing the merchant website 124,224 via the secure proxy server 132,232.

Using this approach, session handoff is possible even without alteration of or integration to the merchant website, and without the knowledge of the merchant or merchant webserver 122,222. The contact center 110,210 can provide such service without requiring changes at the merchant.

After the session handoff has been completed, the secure proxy server 132,232 on the secure data platform 130,230 may terminate the connection 156,256 between the agent's computer 118,218 and secure proxy server 132,232 in which case the customer 142,242 browses the merchant website 124,224 alone.

Alternatively, the secure proxy server 132,232 on the secure data platform 130,230 may mediate communication between the merchant website 124,224 and both the customer and agent browsers. In this case, co-browsing is possible. Depending on the required level of input from customer and/or agent, co-browsing is possible in a number of different scenarios: view-only by agent, view-and-control by agent, view-only by customer, etc.

The secure proxy server 132,232 may also be configured to replicate or mirror inputs from customer and/or agent, to allow the other party to view (for example) mouse movements, on-screen data entries or similar.

The secure proxy server 132,232 on the secure data platform may also, in mediating the communications, be configured to alter the input or output on one or more of the connections between agent, customer, and merchant. Using predefined logic, the secure proxy server 132,232 may be configured to detect sensitive data that would otherwise be output on one or both of the agent's browser 112,212 and customer's browser 146,246, and mask the detected sensitive data to prevent output of the sensitive data on one or both of the agent's browser 112,212 and customer's browser 146,246. In this way, for example, the agent 116,216 may be restricted from access to sensitive data being entered by the customer 142,242, such as credit card data, social security details, home addresses, or any other similar sensitive personal data. In this way, also, the customer 142,242 may be prevented from accessing sensitive data displayed to, or entered by, the agent 142,242. For example, sensitive agent login details, or system passwords which should be used by internal merchant staff members only. The masking implemented by the secure proxy server 132,232 may comprise simply not displaying the sensitive data or visually indicating the presence of sensitive data without displaying the sensitive data itself (e.g. using dots or stars/asterisks in place of the characters of the sensitive data).

The secure proxy server 132,232 on the secure data platform may provide enhanced functionality to the parties, over and above that provided by the unmodified merchant website by adding additional visual elements to the merchant web pages of the merchant's website 124,224 served to the agent 116,216 or customer 142,242.

For example, the agent 116,216 may be presented with a text box into which they can type the customer's mobile phone number, so that the secure proxy server 132,232 can send a handoff link via SMS to that mobile number.

In another example, the customer 142,242 may see reassurance messages such as "The agent cannot see your credit card details". In another example, the secure proxy server 132,232 may insert a "terminate connection" button on to the customer's web pages, thus allowing the customer 142,242 to disconnect the agent's session at any time upon selection of the button. This would give the customer 142,242 confidence that should the agent browse, for example, into an area of a customer's private data presented on the merchant website, that the customer 142,242 could stop such interaction.

The secure proxy server 132,232 may also replace all or parts of pages displayed to the agent 116,216 or customer 142,242, with alternative content. For example, a login screen which may normally be designed for customer display and customer login, may be replaced with a different login screen, when mediated by the secure data platform for display to the agent 116,216. This may, for example, allow an agent 116,216 to log into the customer's online details by using an administrator profile or credentials, or by using a separate login process drawn from another platform such as an internal or external CRM system or other resource.

Alternatively, if the customer 142,242 would normally be required to enter their own sensitive payment card details into a payments panel, the agent 116,216 may instead override such request by logging the purchase to a separate internal account.

The secure proxy server 132,232 may also alter non-visual elements received by the agent or customer, including those which alter the behaviour or states or properties of the customer's browser 146,246. For example, the secure proxy server 132,232 may store history-related data in the data cache 134,234, corresponding to web pages browsed by the agent 116,216. On handoff to the customer 142,242, the secure proxy server 132,232 may then insert client-side scripting to manipulate the contents of the browser history. It may do this by inserting, for example, scripting which invokes the HTML5 history.pushState( ) method. This method allows a webpage to populate a browser's history with new sites. Thus the customer's browser history may be populated with the sites recently browsed by the agent. The customer could then use the browser 'back' and 'forwards' buttons to navigate fluidly through, for example, a merchant website just as the agent had done previously. In another example, the secure proxy server 132,232 may alter the 'User-Agent' as defined in RFC 1945. The User-Agent information is communicated in HTTP requests by the customer browser to the merchant web server. The secure proxy server 132,232 may, for example, change the customer's 'User-Agent' to the agent's 'User-Agent'. In this way, the merchant web server may not be able to detect that the customer is browsing from a different browser to that of the agent.

The secure proxy server 132,232 may also change the responses sent from customer or agent sessions to the merchant website. These modified responses may allow the merchant website 124,224 to process transactions or requests in the manner expected, but using different data, different inputs, or even to bypass such process entirely. For example, the secure proxy server 132,232 could pass login credentials belonging to the customer 142,242 and used for logging into the merchant website 124,224 directly to the merchant website, even in cases when the agent 116,216 is browsing the merchant website. Thus, the agent and contact center systems are never exposed to the customer's login credentials, but the agent can browse the merchant website as though they were the customer.

Further, the secure proxy server 132,232 may, for example, cache the customer's sensitive data temporarily in the data cache 134,234, and submit them to the merchant website 124,224 without exposing them to the agent 116, 216. For example, the secure proxy server 132,232 could ask for, and cache, a customer's answer to an online medical questionnaire. The customer 142,242 could hand off their browsing session to an agent 116,216 for assistance with other non-sensitive aspects of the questionnaire. When complete, the secure proxy server 132,232 combines the cached sensitive data with the agent's non-sensitive input, for a complete submission to the merchant website 124,224. Thus, the agent and contact center systems are never exposed to the sensitive data, but the entire merchant website 124,224 process operates as normal.

In another case, the secure proxy server 132,232 may recognize that the agent 116,216 is a trusted user of the merchant website 124,224, and hence be directed by the secure data platform to not ask for customer login. Alternatively, if an agent's accredited details have been cached once for a particular merchant web resource, the secure proxy server 132,232 may continue providing these trusted agent credentials for different merchant web resources as the customer 142,242 browses them. Thus, the customer 142, 242 is granted access to these different areas without the merchant or agent revealing the sensitive login details of the agent 116,216.

In another case, an agent 116,216 may, for example, be able to apply a discount to a customer's purchase, for example through the entry of a voucher code to the merchant website 124,224, without exposing such voucher code to the customer 142,242. This voucher code may be presented by the secure data platform to the merchant website 124,224 across multiple customer purchases on behalf of the customer, even after the conversation with the agent 116,216 has been terminated.

As explained above, in the environment 100, the communication between the customer 142 and agent 116 may take many forms. For example, the customer 142 may use a telephone to contact the agent 116, such call being made from the same device as on which the customer receives the handoff link from the secure data platform. Calls may be made from a different device, and a call may be made from the agent 116 to the customer 142. Communication may also be through online channels such as video conferencing, through a VoIP call, using smart home assistant devices such as Amazon Alexa® or Google Home™, or through any other channel.

The communication may be direct to the contact center, or may take any other indirect route. For example, the communication may be a phone call which may pass through the secure data platform itself, that is, via the secure proxy server 132. In this case, the secure proxy server 132 may be able to determine or infer details about the customer 142 or the customer's communication device, or other aspects. This data may be used to aid the handoff process. For example, the secure data platform may be able to determine the customer's Calling Line Identification (CLI), for future transmission of SMS messages related to handoff.

In the environments 100,200 the secure proxy server 132,232 outputs session hand-off information (comprising an address to which a connection request can be directed from the customer environment 140,240 and the session identifier) for delivery to the computing device 148,248. The session hand-off information may, but not necessarily, take the form of a handoff link (a URL including a reference to session identifier.

The output of the session hand-off information by the secure proxy server 132,232 may be achieved in various ways.

For example, in an embodiment in the environment 100 whereby the communications device 144 executes the customer browser 146, the communication service 136 may output the session hand-off information to the communications device 144 using a device identifier of the communications device 144. For example, the communication service 136 may send an SMS message comprising a handoff link to the communications device 144. It will be appreciated that this is also applicable to the environment 200 whereby a communications service is utilized to output the handoff link to the computing device 248 using a device identifier of the computing device 248.

In other embodiments, the secure proxy server 132,232 outputs the session hand-off information using a device identifier of a further computing device associated with the customer 142,242 that is different to the computing device 148,248 executing customer browser 146,246.

For example, in environment 100, the secure proxy server 132 may output the session hand-off information using a device identifier (e.g. phone number) of the communications device 144 and transmit the session hand-off information via an SMS message to the communications device 144. Alternatively, the secure proxy server 132 may output the session hand-off information using a device identifier of a further computing device associated with the user 142 not shown in FIG. 1. For example, the session hand-off information may be sent via an IP message to the customer's home 'smart assistant' such as their Amazon Alexa® or Google Home™ device using the IP address of such a device, which may audibly output the session hand-off information to the customer 142.

The customer may then then type the required session hand-off information into their customer browser 146 on computing device 148 using an internal or external keyboard of the computing device 148, or through a microphone of the computing device 146, or may enter such information verbally through a microphone of the computing device 148. Alternatively, the customer may utilize a third-party service or application to communicate the session handoff information, such as by speaking to an Amazon Alexa® device: "Alexa, accept Big Merchant shopping session 7559".

In an alternative embodiment, a user identifier of the customer 142,242 may be used by the secure proxy server 132,232 to output the session hand-off information. The user identifier of the customer 142,242 may take many forms. For example, the secure proxy server 132,232 may output an email comprising the session hand-off information to an email address of the customer 142,242. Alternatively, the secure proxy server 132,232 may output an IM chat message comprising the session hand-off information to an IM username of the customer 142,232. It will be appreciated that the customer 142,242 may use any computing device to receive such communications, such as the computing device 148, 248 or a further computing device (e.g. the communications device 144 in environment 140).

The session hand-off information may be in text form suitable for the customer to read the session hand-off information and enter into the customer browser 146,246 using any of the techniques discussed above.

Alternatively, the session hand-off information may be encoded into image data (e.g. two dimensional barcode such as a Quick Response (QR) barcode) transmitted in a message output by the secure proxy server 132,232 using the user identifier of the customer 142,242.

For example, in environment 100, it will be appreciated that when the customer 142 uses communications device 144 to receive the session hand-off information message, the customer 142 may then scan the QR code displayed on the screen of the communications device 144 with the computing device 148.

In other embodiments, the secure proxy server 132,232 outputs the session hand-off information to the agent's computer 118 by using a device identifier (e.g. IP address) of the agent's computer 118,218. For example, displaying the session hand-off information on a web page served to the agent browser 112,212. In alternative embodiments, a user identifier of the agent 116,216 may be used by the secure proxy server 132,232 to output the session hand-off information. The user identifier of the customer agent 116,216 may take many forms (e.g. an email address or an IM username of the agent 116,216). It will be appreciated that the agent 116,216 may use any computing device to receive such communications, such as the computing device 118, 218 or a further computing device in environment 110,210).

Once the agent 116,216 is in receipt of the session hand-off information this may be communicated to the computing device 146,246 in a variety of different of ways.

In embodiments, the customer 142,242 may see or hear the session hand-off information. For example, the agent 116,216 may communicate the session hand-off information to the customer 142,242 by any known communication method such as over a phone call (for example, directing a customer to a third party referral website with instructions such as "Please go to www.tinyurl.com and enter the code 1234"), in an email, in an IM message etc. In another example, the secure proxy server 132,232 generates a communication message which includes the session handoff information for output on the agent's mobile device 118,218. The session handoff information may be visually displayed on the agent's computer 118,218 and the customer 142, 242 reads or listens to this message (read out by the agent 116,216) and enters the session hand-off information into the customer browser 146,246 using any of the techniques discussed above. In another example, the session handoff information may be audibly output by the agent's computer 118,218 to the customer 142,242. The session hand-off information may then be entered into the customer browser 146,246 by the customer 142, 242 using any of the techniques discussed above.

In another embodiment the session hand-off information may be encoded into image data (e.g. two dimensional barcode such as a Quick Response (QR) barcode) transmitted from the secure proxy server 132,232 to the agent's computer 118,218. For example, in a retail environment, a retail assistant (agent 116,216) may have a mobile tablet 118,218 on which he is filling a virtual shopping cart on behalf of the customer 142,242. The customer 142,242 may wish to continue her shopping experience at home. The retail assistant (agent 116,216) may initiate handoff of the shopping session, whereby the secure proxy server 132,232 generates a QR code, or similar visual code, for display on the screen of the retail assistant's mobile tablet 118,218. The customer may use the camera on computing device 148,248 to scan the QR code, which contains the session handoff information. Thus the customer 142,242 is able to take control of her own shopping basket, and complete the shopping session and/or payment later.

In other embodiments, instead of the customer scanning a QR code, the customer may physically hold her computing device 148,248 near the retail assistant's mobile tablet 118,218, and the session handoff information may be communicated through Near-field communication (NFC).

It will be appreciated that in the embodiments described above, the outputting of the session hand-off information by the secure proxy server 132,232 may be implemented by the secure proxy server 132,232 instructing a communications service to communicate the session hand-off information (e.g. for SMS, email, IM communications etc.). As explained above, the communication service may be implemented as a module on the secure proxy server 132 or be external to the secure proxy server 132 e.g. implemented on a server external to the secure proxy server 132.

In other embodiments, if the customer's call to the agent 116 passes through the secure data platform itself, then the secure proxy server 132 may output the session hand-off information in audio to the customer 142 over the phone call. The session hand-off information may be transmitted in an audible message that is comprehensible by the customer 142. Alternatively the session handoff information could be transmitted by the secure proxy server 132 to the customer's communications device 144 in encoded form (e.g. DTMF), or through inaudible 'steganographic' approaches, or similar. The channel for such message could also be through IP packet headers, or other non-audio mechanisms associated with an audio communication.

Similarly, if as above the communication between the customer 142 and agent 116 is a call passing through the secure data platform itself, the secure proxy server 132 may provide the 'link' to the agent 116 during the call, for example by using Computer Telephony Integration (CTI) direct to the agent's desktop computer. The agent 116 may then read a whisper or similar 'short code' to the customer 142 over the phone.

The session hand-off information may then be entered into the customer browser 146 by the customer 142 using any of the techniques discussed above.

The session hand-off information also could be received into the customer's communication device through its microphone using an alternate communications format.

For example, in environment 100, the format of the communication to the customer browser 146 could comprise audio which contains or embeds the session handoff information in an encoded or steganographic format. Such audio may be transmitted over a telephone call. The customer 142, calling from an office desk phone (e.g. communications device 144), is on a telephone call with an agent 116, and where the call passes through the secure data platform 130. The agent 116 initiates session handoff, and the secure proxy server 132 plays audio directly to the customer's office desk telephone 144. The customer 142 places the desk phone into 'speaker' mode, and such that a microphone of the computing device 148 can hear the server-generated audio. The computing device 148 detects and decodes the session handoff information and enters it to the customer browser 146. In a retail environment, for example, such audio may also be transmitted by a retail assistant's point-of-sale or mobile device, to a customer's communications device. The customer's communications device may interpret this audio to extract, and hence receive, the session handoff information.

In embodiments described above, the session hand-off information may comprise a complete reference to the required session handoff information (the full address at which the third communications session can be requested, and the unique session ID), or it may contain a reference to some or all of the required session handoff information. For example, a URL shortening service may be used in order to simplify or reduce the information required to be entered by the customer. Instead of directing the customer to website merchant.securedataplatform.com/x6yy8u95dm, the handoff link may direct the customer to tinyurl.com/884. The 'tiny URL' service then resolves the full address on behalf of the customer, whose data entry requirements are substantially reduced.

Whilst embodiments have been described above with reference to the secure data platform handing off a customer's browser session to an agent 116,216, a substantively similar implementation would also allow the secure data platform to hand off a customer's browser session to an agent 116,216. This would allow an agent 116; 216 to take control of an existing customer browsing session, and complete a service task on behalf of the customer. For example, if a customer 142,242 partly filled an online shopping basket, but was unable to locate a particular item, the customer 142,242 could hand off the live basket to the agent 116,216 for addition of this item.

In another case, the customer 142 may be unable to remember the required username or password required to complete a transaction online. The customer 142 may call the merchant's contact center, and after passing a separate identity verification process, hand off control of the customer browsing session to an agent 116. The agent 116 could then reset the online security details, before passing control of the browsing session back to the customer 142, who could then enter a new password. This would ensure that the agent 116 had no access to the customer's new online password.

It can also be seen with these examples that a combination of handoffs, between agent 116,216 and customer 142,242, allow for enhanced customer service and improved security, as well as other improvements.

It can be appreciated that the 'hand off' process may also be used, for example, by two agents, and need not involve the customer. For example, Agent A may start a customer service task on the merchant website, but then need to pass the task to Agent B, perhaps for escalation, or perhaps at the end of a working shift. The handoff process would enable Agent B to 'pick up' the session, and complete the task.

In another case, a customer 142 may already be browsing the merchant website prior to phoning the contact center for assistance. In this case, it would be good to allow the customer 142 to hand off a browsing session to the contact center agent 116. This may be accomplished if the merchant has implemented some additional functionality on its website, which allows such session handoff capabilities. The merchant may, for example, have enabled sharing, with the data cache 134 in the secure data platform 130, the session-related information generated by the merchant website. This could allow the customer 142 to change the domain they are browsing from (say) merchant.com to merchant.securedataplatform.com (or for example to share.merchant.com). This could also be implemented by a new button or similar, displayed on the merchant website merchant.com. Such functionality may also be implemented by the appending of a 'quick share' code on the merchant's website, or to pages mediated by the secure data platform, which the customer 142 could read to the contact center agent 116. In any case, the customer 142 could continue to browse at the different domain merchant.securedataplatform.com, or to hand off the browser session to an agent 116, or both.

Other types of integration between the secure data platform and the merchant webserver or backend, may allow for different methods of handoff.

Using the above approaches, it is also possible to hand off a browser session from a customer to an agent, initially while conversing over IM chat, but then changing channels to, for example, a telephone call. Such handoff could be made at any stage of the communication.

It can be appreciated that, in the case where a customer is handing off a communications session to an agent, additional methods may exist for the receipt of the handoff link at the agent's computing device, as compared with a handoff from agent to customer. For example, some session handoff elements such as unique session ID may be communicated using DTMF keypresses on the customer's phone, which are then interpreted by CTI and passed directly to the agent's computer, with no additional data entry required by the agent. Other session handoff elements may be configured at a CRM system for communication to the agent computing device.

Figure 3A:
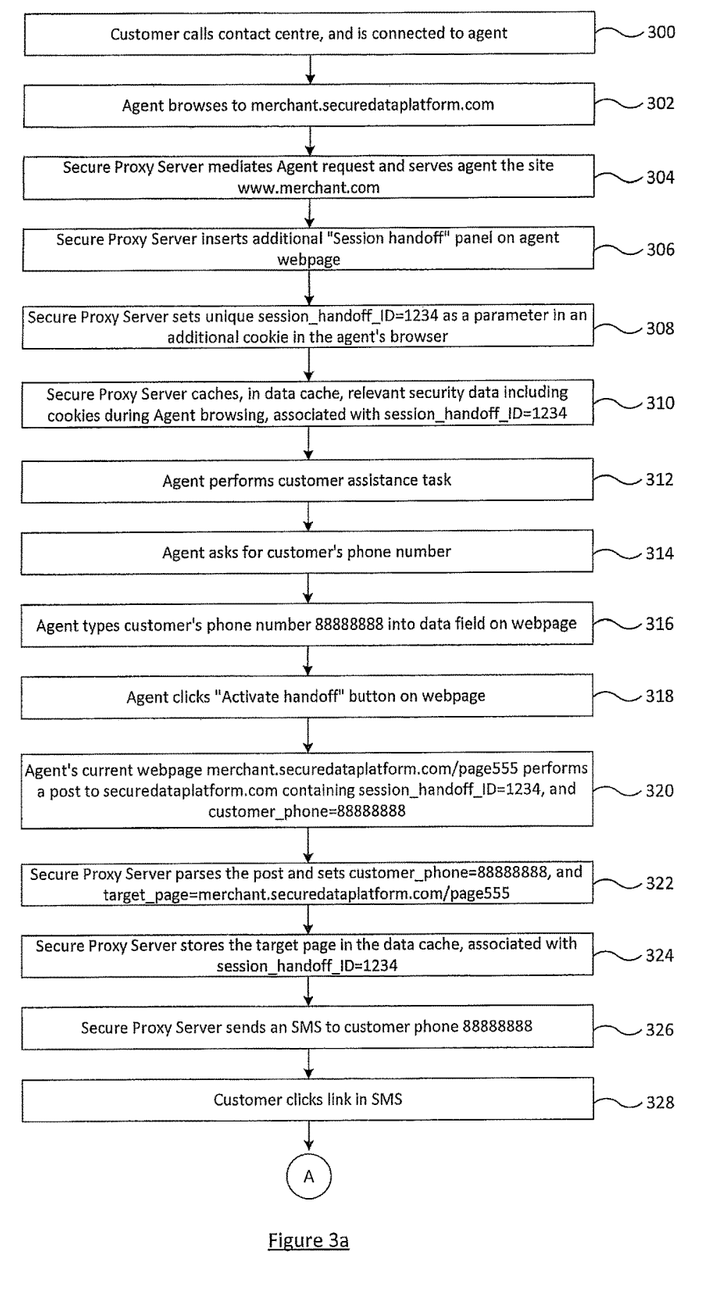
FIGS. 3a and 3b is a flowchart of a method of handing off a communications session to a customer on a phone call in the environment of FIG. 1.
Figure 3B:
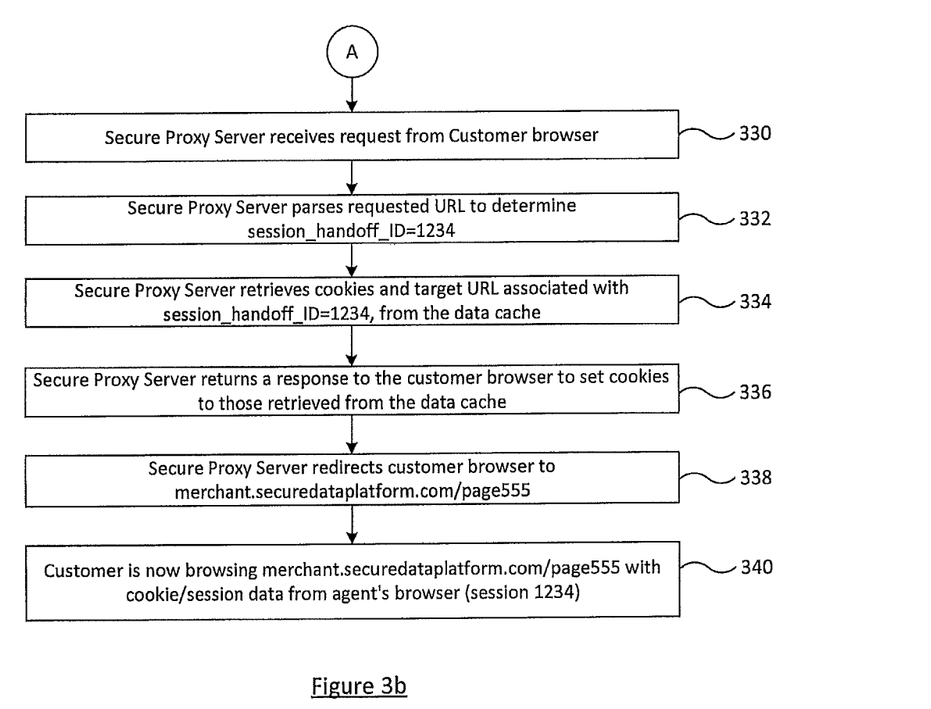

FIG. 3 shows a typical process flow for an embodiment in the environment 100 shown in FIG. 1 in which a contact center agent 116, conversing with a customer 142 over a telephone call, hands off a browsing session to the customer 142.

At step 300, the customer 142 calls contact center 110 using communications device 144, and is connected to agent 116.

At step 302, the agent 116 browses to a proxied website, for example merchant.securedataplatform.com, which is shown by the global DNS (Domain Name System) to be hosted at the SDP 130.

At step 304, the secure proxy server 132 mediates the agent request and serves agent 116 the original site www.merchant.com.

The secure proxy server 132 serves the site www.merchant.com in modified form by inserting, at step 306, an additional user interface element e.g. a "Session handoff" panel into the webpage www.merchant.com served to the agent 116, which includes a data field for the customer's mobile phone number, and also an "Activate handoff" button. It will be appreciated that the label "Activate handoff" is merely an example and an alternative button label may be used.

At step 308, the secure proxy server 132 generates a unique session identifier to identify the browsing session e.g. unique session_handoff_ID=1234 and sets this unique session identifier as a parameter in an additional cookie in the agent's browser 112.

At step 310, the secure proxy server 132 caches, in the data cache 134, relevant security data including browser cookies during agent browsing, associated with session_handoff_$_{ID}$=1234. That is, the secure proxy server 132 caches the browser cookies and the unique session identifier in the data cache 134.

At step 312, the agent 116 performs a customer assistance task. It will be appreciated that this could take many forms.

At step 314, the agent 116, during the call, asks the customer 142 to provide their telephone number.

At step 316, the agent 116 enters the customer's telephone number (e.g. 88888888) into the data field on the webpage served to the agent web browser 112.

At step 318, the agent selects the "Activate handoff" button on the webpage served to the agent web browser 112.

At step 320, the agent's current webpage e.g. merchant.securedataplatform.com/page555 (the webpage served in the agent browser 116 when the "Activate handoff" button was selected) performs a post to securedataplatform.com, with fields containing the unique session identifier (session_handoff_ID=1234), and customer's telephone number (customer_phone=88888888). That is, a request to initiate a handoff of the browsing session is sent from the agent's computer 118 to the secure proxy server 132.

At step 322, the secure proxy server 132 parses the post, extracts required field values, and sets the customer's telephone number as customer_phone=88888888, and a target webpage to be served as target_page=merchant.securedataplatform.com/page555.

At step 324, the secure proxy server 132 stores the target webpage in the data cache 134, associated with the unique session identifier, session_handoff_ID=1234.

At step 326, using the communication service 136, the secure proxy server 132 sends an SMS message to customer's phone using the telephone number 88888888. The SMS message comprises a handoff link to merchant.securedataplatform.com/session_handoff.php?id=1234. That is, the SMS comprises an address to which a connection request can be directed from the customer environment 140, and the session identifier.

The communications device 144 may be associated with the telephone number 88888888 in which case the SMS message is sent to the communications device 144. Alternatively, a further communications device not shown in FIG. 1 may be associated with the telephone number 88888888 and thus receive the SMS message.

At step 328, in embodiments whereby the communications device 144 executes the customer browser 146 the customer selects the link provided in the SMS message. Alternatively, in embodiments whereby the customer 142 is associated with a computing device 148 executing a customer browser 146, at step 328 the customer uses customer browser 146 on computing device 148 to browse to the link location.

In response to step 328 a connection request is sent from the customer browser 146 to the secure proxy server 132. The connection request comprises a requested URL including the session identifier (e.g. merchant.securedataplatform.com/session_handoff.php?id=1234).

At step 330, the secure proxy server 132 receives the connection request sent from customer browser 146.

At step 332, the secure proxy server 132 parses the requested URL (e.g. merchant.securedataplatform.com/session_handoff.php?id=1234) to determine the unique session identifier, session_handoff_ID=1234.

At step 334, the secure proxy server 132 retrieves browser cookies and URL of the target webpage associated with session_handoff_ID=1234, from the data cache 134.

At step 336, the secure proxy server 132 returns a response to the customer browser 146, the response requesting that the customer browser 146 stores and sets its browser cookies to those retrieved from the data cache 134. The customer browser 146 then stores and sets its browser cookies as so requested.

At step 338, the secure proxy server 132 redirects the customer browser 146 to the target webpage, merchant.securedataplatform.com/page555, by sending an HTTP Redirect or similar command so that the customer browser 146 changes browsing from merchant.securedataplatform.com/session_handoff.php?id=1234 to merchant.securedataplatform.com/page555. The customer browser 146 then requests the target webpage and establishes a communications session with the merchant website 124, proxied through the secure proxy server 132.

One or more messages may be sent from the secure proxy server 132 to the customer browser 146 to transmit (i) the request that the customer browser 146 stores and sets its browser cookies to those retrieved from the data cache 134, (ii) the browser cookies; and (iii) the request that the customer browser 146 establishes the communications session with the merchant website 124, proxied through the secure proxy server 132.

At step 340, the customer 142 is now browsing the target webpage merchant.securedataplatform.com/page555 with cookie/session data that was stored by the agent's browser 112 during session 1234.

Thus it can be seen that this embodiment enables a customer who starts a transaction by speaking with a contact center agent by telephone, to seamlessly switch to having control of the transaction to enable the customer to browse a merchant website themselves to complete the transaction.

Whilst steps 316 and 326 have been described with reference to the entering of a telephone number and transmission of an SMS message to the customer 142, it will be appreciated from the above that this is just one example method of communicating the address (link) to which a connection request can be directed from the customer environment 140.

Figure 4A:
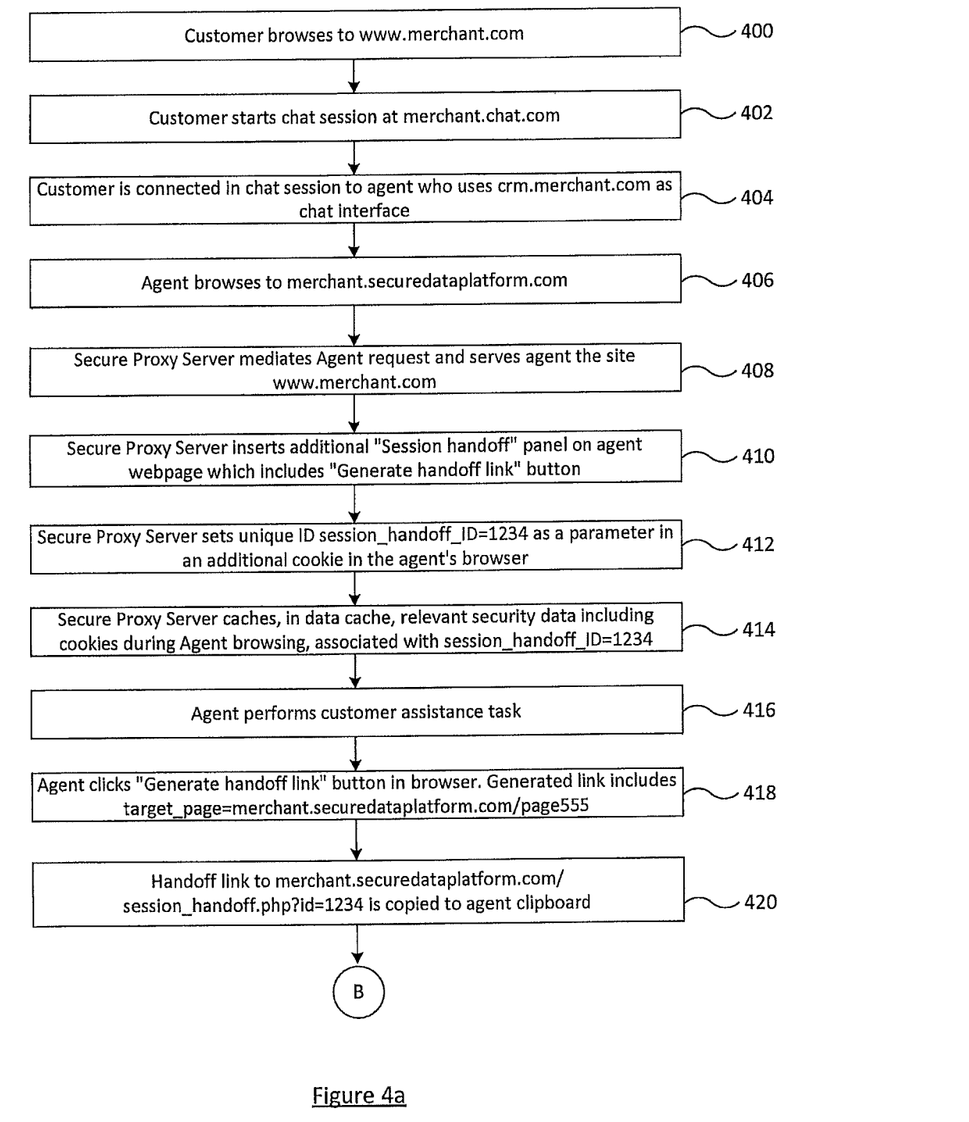
FIGS. 4a and 4b is a flowchart of a method of handing off a communications session to a customer on a chat session in the environment of FIG. 2.
Figure 4B:
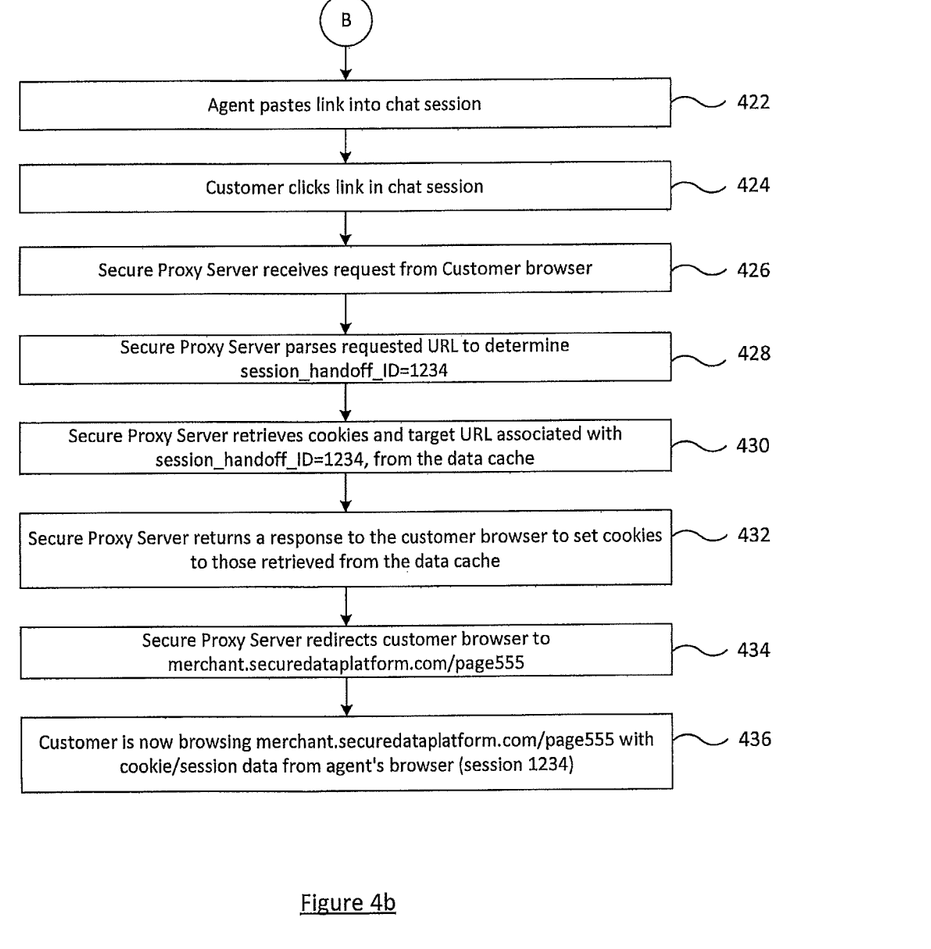

FIG. 4 shows a typical process flow for an embodiment in the environment 200 shown in FIG. 2 in which a contact center agent 216, conversing with a customer 242 over an IM chat session, hands off a browsing session to the customer 242.

At step 400, the customer 242 using customer browser 246 browses to www.merchant.com 224.

At step 402, the customer 242 starts an IM chat session at merchant.chat.com, served by merchant chat server 272 and visible in customer browser 246.

At step 404, the customer 242 is connected in an IM chat session to an agent 216 who uses a chat session merchant.chat.com served by chat server 272, visible within merchant CRM tool crm.merchant.com, served by merchant CRM server 226.

At step 406, the agent 216 using the agent browser 212 browses to proxied website merchant.securedataplatform.com served by the secure proxy server 232.

At step 408, the secure proxy server 232 mediates the agent request and serves the agent 212 the original site www.merchant.com 224.

The secure proxy server 232 serves the original site www.merchant.com in modified form by inserting, at step 410, an additional user interface element e.g. a "Session handoff" panel into the webpage, which includes a "Generate handoff link" button. It will be appreciated that the label "Generate handoff link" is merely an example and an alternative button label may be used.

At step 412, the secure proxy server 232 generates a unique session identifier to identify the browsing session e.g. unique ID session_handoff_ID=1234 and sets this unique session identifier as a parameter in an additional cookie in the agent's browser 212.

At step 414, the secure proxy server 232 caches, in data cache 234, relevant security data including browser cookies during agent browsing, associated with session_handoff_ID=1234. That is, the secure proxy server 232 caches the browser cookies and the unique session identifier in the data cache 234.

At step 416, the agent 216 performs a customer assistance task. It will be appreciated that this could take many forms.

At step 418, the agent 216, during the IM chat session, clicks the "Generate handoff link" button on the webpage served to the agent browser 216. The agent browser 212 communicates selection of the "Generate handoff link" button to the secure proxy server 232. In response to detecting selection of the "Generate handoff link" button the secure proxy server 232 generates a handoff link. The handoff link includes an address to which a connection request can be directed from the customer environment 240, and reference to the unique session identifier session_handoff_ID=1234. The secure proxy server 232 updates the data cache 234, so the storage location related to the unique session identifier session_handoff_ID=1234 also stores the agent's current webpage e.g. merchant.securedataplatform.com/page555 (the webpage served in the agent browser 216 when the "Generate handoff link" button was selected). That is, the data cache 234 now contains a relationship between the unique session identifier (session_handoff_ID=1234), the relevant security data (including browser cookies), and the agent's current webpage (merchant.securedataplatform.com/page555).

The secure proxy server 232 is configured to send the generated handoff link to the agent's browser 212.

At step 420, the handoff link, pointing to merchant.securedataplatform.com/session_handoff.php?id=1234, is copied to the agent's computer clipboard, either by the agent 216 (following display of the link in the agent's browser 212) or automatically by the agent's browser 216 in response to receipt of the handoff link.

At step 422, the agent 216 pastes the handoff link into the IM chat session and sends the link in an IM chat message to the customer 242.

At step 424, the customer 242 sees the handoff link in received message in the IM chat session, and selects the handoff link.

In response to step 424 a connection request is sent from the customer browser 246 to the secure proxy server 232. The connection request comprises a requested URL (merchant.securedataplatform.com/session_handoff.php?id=1234).

At step 426, the secure proxy server 232 receives the connection request sent from the customer browser 246.

At step 428, the secure proxy server 232 parses the requested URL (e.g. merchant.securedataplatform.com/session_handoff.php?id=1234) to determine the unique session identifier, session_handoff_ID=1234.

At step 430, the secure proxy server 232 retrieves browser cookies and the URL of the target webpage associated with session_handoff_ID=1234, from the data cache 234.

At step 432, the secure proxy server 232 returns a response to the customer browser 246, the response requesting that the customer browser 246 stores and sets its browser cookies to those retrieved from the data cache 234. The customer browser 246 then stores and sets its browser cookies as so requested.

At step 434, the secure proxy server 232 redirects customer browser 246 to the target webpage, merchant.securedataplatform.com/page555, by sending an HTTP Redirect or similar command so that the customer browser 246 changes browsing from merchant.securedataplatform.com/session_handoff.php?id=1234 to merchant.securedataplatform.com/page555. The customer browser 246 then requests the target webpage and establishes a communications session with the merchant website 224, proxied through the secure proxy server 232.

One or more messages may be sent from the secure proxy server 232 to the customer browser 246 to transmit (i) the request that the customer browser 246 stores and sets its browser cookies to those retrieved from the data cache 234, (ii) the browser cookies; and (iii) the request that the customer browser 246 establishes the communications session with the merchant website 224, proxied through the secure proxy server 232.

At step 436, the customer 242 is now browsing the target webpage merchant.securedataplatform.com/page555 with cookie/session data that was stored by the agent's browser during session 1234.

Thus it can be seen that this embodiment enables a customer who starts a transaction by speaking with a contact center agent in an IM chat session, to seamlessly switch to having control of the transaction to enable the customer to browse a merchant website themselves to complete the transaction.

Whilst steps 422 and 424 have been described with reference to transmission of the link to the customer 242 in the IM chat session, it will be appreciated that this is just one example method of communicating the link to the customer device 248 and other methods may be used.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment limits future implementation of the invention on yet to be discovered or defined means of execution.

The invention has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A method of handing off a communications session between a first computing device and at least one second computing device, to a third computing device, the method comprising, at a server:
  establishing a first connection with the first computing device associated with a contact center agent;
  establishing a second connection with the at least one second computing device;
  mediating a communications session between the first computing device and the at least one second computing device;
  receiving session-related information associated with said communications session from the at least one second computing device via the second connection, and storing said session-related information in a data cache;
  generating a session identifier to identify said communications session and storing said session identifier in the data cache;
  sending a message comprising at least the session identifier to the first computing device via the first connection;
  receiving via the first connection a request from the first computing device to initiate handoff to the third computing device associated with a user, the request comprising the session identifier, and wherein the user is different than the contact center agent;
  outputting an address to which connection request for a third connection can be directed, and the session identifier, for delivery to the third computing device;
  receiving a connection request from the third computing device, the connection request comprising the session identifier;
  in response to receiving the connection request, establishing the third connection with the third computing device;
  using the session identifier to retrieve the session-related information from the data cache;
  sending at least one message to the third computing device, the at least one message comprising the session-related information, a request to store the session-related information on the third computing device, and a request to establish a further communications session with the at least one second computing device;
  serving the further communications session to the third computing device in response to receiving, from the third computing device, a request to establish the further communications session with the at least one second computing device; and
  mediating the further communications session between the at least one second computing device and the third computing device.

2. The method according to claim 1, further comprising, at the server:
  in response to establishing the third connection with the third computing device, terminating the first connection with the first computing device.

3. The method according to claim 1, further comprising, at the server:
  in response to establishing the third connection with the third computing device, mediating the further communications session between the first computing device and the third computing device.

4. The method according to claim 1, further comprising, at the server:
  during mediating the further communications session, detecting sensitive data for output to at least one of the first computing device and the third computing device and masking the sensitive data to prevent output of the sensitive data at the at least one of the first computing device and the third computing device.

5. The method according to claim 1, the method comprising the server outputting a message, comprising the address and the session identifier, to the third computing device using a device identifier of the third computing device.

6. The method according to claim 1, the method comprising the server outputting a message, comprising the address and the session identifier, to a further computing device associated with said user using a device identifier of the further computing device, the at least one message for output at the further computing device to thereby facilitate delivery of the address and the session identifier to the third computing device.

7. The method according to claim 1, the method comprising the server outputting a message, comprising the address and the session identifier, to the first computing device using a device identifier of the first computing device, the at least one message for output at the first computing device to thereby facilitate delivery of the address and the session identifier to the third computing device.

8. The method according to claim 1, the method comprising the server outputting a message, comprising the address and the session identifier, using an identifier of said user, the at least one message for receipt at the third computing device, or at a further computing device associated with said user to thereby facilitate delivery of the address and the session identifier to the third computing device.

9. The method according to claim 1, the method comprising the server outputting a message, comprising the address and the session identifier, using an identifier of the contact center agent associated with said first computing device, the at least one message for output at the first computing device to thereby facilitate delivery of the address and the session identifier to the third computing device.

10. The method according to claim 1, further comprising, at the server:
bridging a call between the contact center agent of the first computing device and the user of the third computing device; wherein sending the message to the user of the third computing device comprises sending the message as an audio message to the user during the call.

11. The method according to claim 10 wherein the call is conducted by the user of third computing device using the third computing device or a communications device associated with the user of the third computing device; and the call is conducted by the contact center agent of the first computing device using the first computing device or a communications device associated with the contact center agent of the first computing device.

12. The method according to claim 1, wherein the request from the first computing device comprises an identifier associated with the user of the third computing device.

13. The method according to claim 1, wherein the request from the first computing device comprises a device identifier associated with the third computing device.

14. The method according to claim 1, wherein the request from the first computing device to initiate handoff to the third computing device comprises a URL of a webpage, the method further comprising, at the server storing the URL of the webpage and the session-related information in association with the session identifier in the data cache.

15. The method according to claim 14, wherein the request from the first computing device to initiate handoff to the third computing device is received in response to selection of a user interface element of said webpage displayed on a display of the first computing device.

16. The method according to claim 14, wherein the request to establish the further communications session with the at least one second computing device in the at least one message comprises the URL of the webpage, and serving the communications session to the third computing device comprises delivering said webpage to a web-browser executed on the third computing device.

17. The method according to claim 1, wherein the communications session comprises a web browser session and the session-related information comprises browser cookies.

18. A computer program product for handing off a communications session between a first computing device and at least one second computing device, to a third computing device, the program product comprising code embodied on a non-transitory computer readable medium and configured so as when executed on a processing apparatus of a server to perform the method of claim 1.

19. A server for handing off a communications session between a first computing device and at least one second computing device, to a third computing device, the server comprising a processing apparatus configured to:
establish a first connection with the first computing device associated with a contact center agent;
establish a second connection with the at least one second computing device;
mediate a communications session between the first computing device and the at least one second computing device;
receive session-related information associated with said communications session from the at least one second computing device via the second connection, and storing said session-related information in a data cache;
generate a session identifier to identify said communications session and storing said session identifier in the data cache;
send a message comprising at least the session identifier to the first computing device via the first connection;
receive via the first connection a request from the first computing device to initiate handoff to the third computing device associated with a user, the request comprising the session identifier, and wherein the user is different than the contact center agent;
output an address to which a connection request for a third connection can be directed, and the session identifier, for delivery to the third computing device;
receive a connection request from the third computing device, the connection request comprising the session identifier;
in response to receiving the connection request, establish the third connection with the third computing device;
use the session identifier to retrieve the session-related information from the data cache;
send at least one message to the third computing device, the at least one message comprising the session-related information, a request to store the session-related information on the third computing device, and a request to establish a further communications session with the at least one second computing device;
serve the further communications session to the third computing device in response to receiving, from the third computing device, a request to establish the communications session with the at least one second computing device; and
mediate the further communications session between the at least one second computing device and the third computing device.

* * * * *